March 20, 1956 L. E. LUFFMAN ET AL 2,738,705
FILE-HOLDING DEVICE FOR CAMERA COPY SUPPORT
Filed March 5, 1953 3 Sheets-Sheet 1
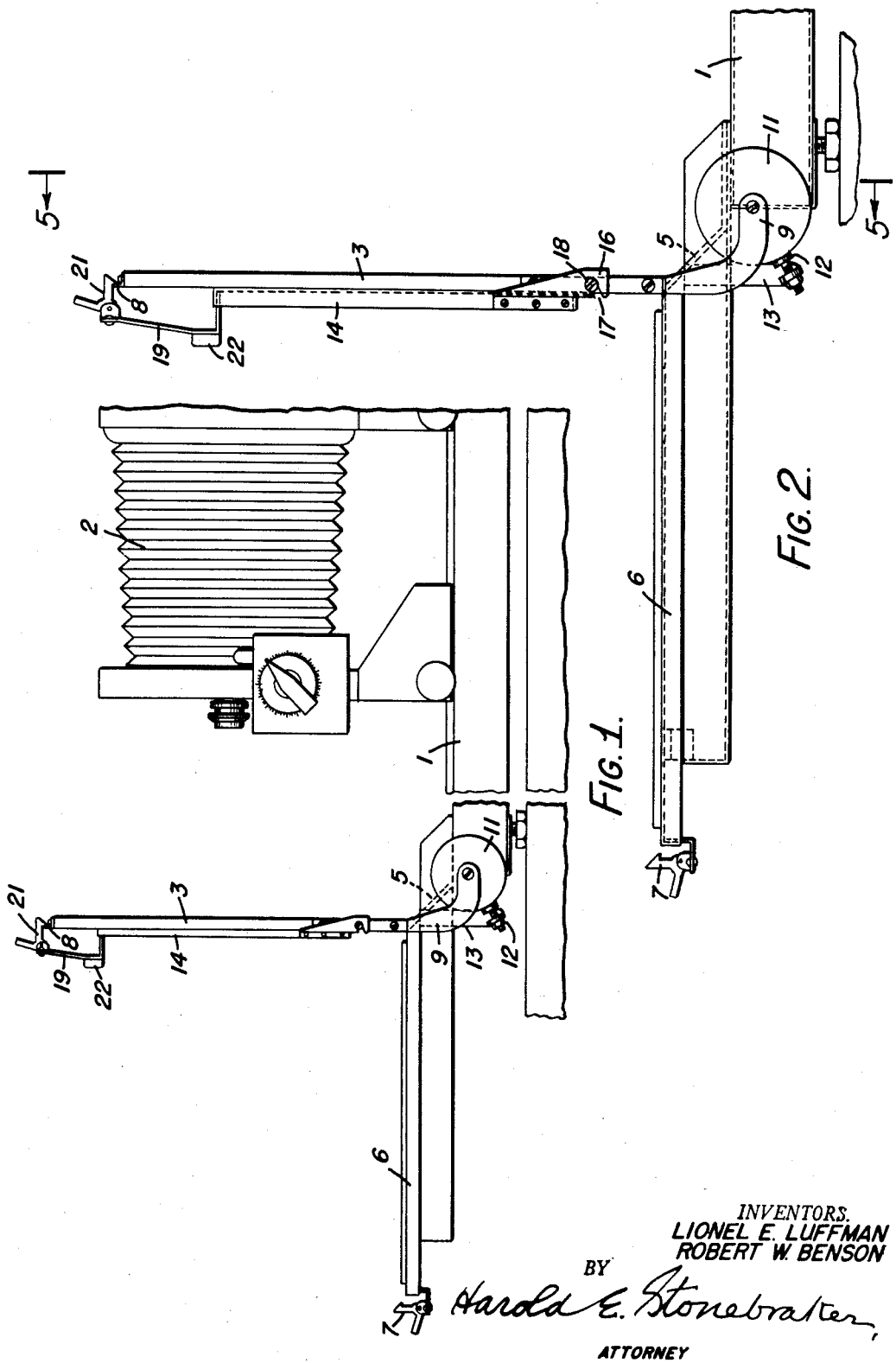
INVENTORS.
LIONEL E. LUFFMAN
ROBERT W. BENSON
BY Harold E. Stonebraker
ATTORNEY

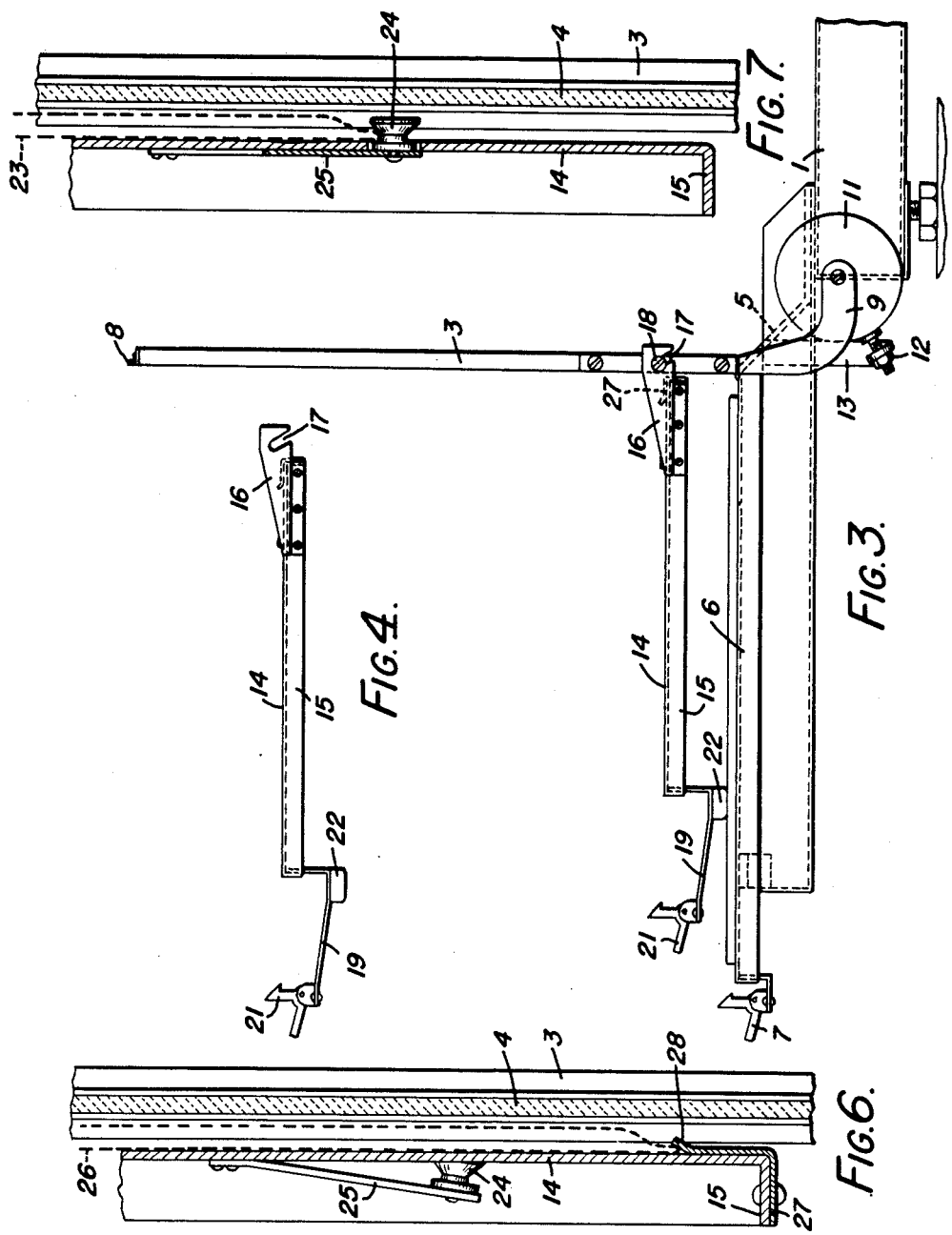

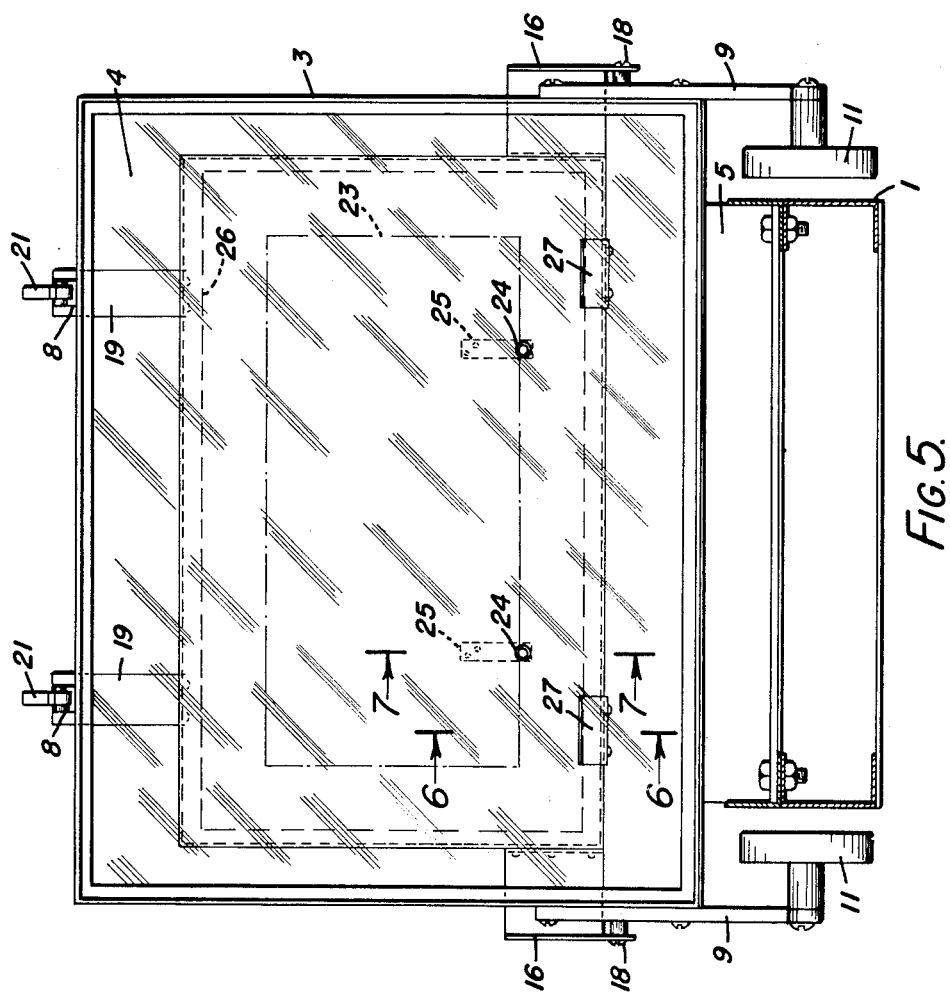

United States Patent Office 2,738,705
Patented Mar. 20, 1956

2,738,705

FILE-HOLDING DEVICE FOR CAMERA COPY SUPPORT

Lionel E. Luffman, Macedon, and Robert W. Benson, Brockport, N. Y., assignors to The Haloid Company, Rochester, N. Y., a corporation of New York Application March 5, 1953, Serial No. 340,592

3 Claims. (Cl. 88—24)

This invention relates to a file-holding device for a camera copy support, with more particular reference to xerographic and photographic copying cameras, and has for its purpose to afford simple and efficient means for conveniently positioning and holding a card or record file in front of a camera and maintaining the same in proper position for photographic exposure.

It is frequently desirable to make a xerographic copy of a series of data cards or records while the latter are arranged in a metal file of conventional construction in flatwise overlapping relationship, and it is a purpose of the invention to afford means for supporting such a card file in proper position in front of the camera for exposure.

In pending application Serial No. 340,591, filed March 5, 1953, there is disclosed a copy-holding apparatus for positioning a copy sheet between a bed member and a transparent cover, and while the structure therein shown is suitable for holding a thin copy sheet of paper or like material, it cannot be used to position and support a bulky metal file since there is insufficient room between the bed member and transparent cover, and the present structure has for its objective to afford a device which can readily be attached to said copy-holding apparatus and used to hold a card file so that the latter can be positioned and held against the transparent cover to enable copying the entire card file and the data appearing on the cards therein.

Another purpose of the invention is to afford a construction in which the bed or support is removable from and quickly attachable to the frame of the transparent cover employed for thin copy sheets, and to enable readily positioning and supporting metal files of different sizes between the transparent cover and the attachable bed so that they are properly centered in relation to the transparent cover.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation showing one embodiment of the invention as applied to a xerographic or other camera, the removable support or bed being shown in upright position as when holding a card file against the transparent cover;

Fig. 2 is an enlarged side elevation of the same with the camera omitted;

Fig. 3 is an enlarged side elevation similar to Fig. 2 and showing the bed or support in its lowered position to receive a file;

Fig. 4 is a side elevation of the bed or support removed from the frame of the transparent cover;

Fig. 5 is a vertical sectional view taken generally on line 5—5 of Fig. 2 looking in the direction indicated, and showing in dotted lines the respective position of a small or large file on the support;

Fig. 6 is an enlarged detail sectional view taken on the line 6—6 of Fig. 5 looking in the direction indicated, showing a large file arranged on the support against the transparent cover, and Fig. 7 is a similar view taken on line 7—7 of Fig. 5, showing a small file arranged on the support against the transparent cover.

The invention is illustrated herein in conjunction with the copy-holding apparatus disclosed in the aforesaid pending application, although applicable to other structures as well, and referring more particularly to the drawings in which like reference numerals refer to the same parts throughout the several views, 1 designates a frame on which is mounted a xerographic or other camera designated generally at 2, while 3 designates a metal frame within which is secured the transparent cover 4 against which the copy sheet or file, as the case may be, is held, the frame 3 being pivotally mounted on the bracket 5 which is attached to the frame 1 in the manner shown and described in the aforesaid copending application. 6 designates a bed member that is also pivotally mounted on the bracket 5 and provided with spring catches 7 engageable with lugs 8 at the top of the transparent cover frame 3 for holding the bed member 6 in upright position when a copy sheet is arranged between it and the transparent cover 4, while 9 designates arms extending downwardly from the frame 3 and laterally away from bed member 6, the arms being mounted upon the frame 3 and carrying weighted elements 11 which function to maintain the frame 3 and transparent cover 4 in upright position. 12 designates adjustable stops mounted on the posts 13 and acting to limit movement of the weighted elements 11 and of the frame 3 in which the transparent cover is mounted. Thus the frame 3 and bed member 6 when locked thereto by the catches 7 are maintained in upright position for holding a copy sheet in front of the camera, and frame 3 can be pulled forwardly and downwardly when the bed member 6 is in its lowered horizontal position for securing a copy sheet thereon before permitting the frame 3 and bed member to resume their vertical positions. The parts and operation thus far described are all in accord with the pending application referred to above, and the present improvement has to do with a device that can be readily attached and conveniently employed for positioning and holding a metal or other record file containing a multiplicity of cards or the like in proper position in relation to the transparent cover 4.

When such a file is to be photographed, it cannot be arranged between the bed 6 and transparent cover as there is insufficient space between these parts and no facility for supporting and holding a metal file therebetween, and in order to accomplish this, a support or plate 14 is provided with depending flanges 15 at the sides to which are attached suitable brackets having at their outer edges side walls 16 containing angularly disposed slots 17 that are detachably engageable with trunnions 18 located at the sides of the frame 3, as shown in Figs. 2, 4 and 5. The slots 17 are inclined upwardly and toward the forward edge of said plate 14, and the angle of the slots 17 in relation to the brackets 16 is such that the support or plate 14 is readily positionable on the trunnions 18 by a downward and rearward motion and when positioned as illustrated in Fig. 3 can be swung to the upright position illustrated in Fig. 2 without becoming accidentally disengaged, and the support or plate 14 is removed from the frame 3 by an upward and forward movement from the position illustrated in Fig. 3.

The trunnions 18 and support or plate 14 are located at a sufficient distance above the horizontal position of the bed 6 to accommodate conventional types of card files and position them properly in relation to the transparent cover and the plate 14 terminates a corresponding distance below the top of frame 3 when in upright position. In order to maintain the plate 14 in upright position, it has attached thereto the right-angle arms 19 which extend from plate 14 to the top of the frame 3 and carry at their outer ends the spring catches 21 which engage lugs 8 on the transparent cover frame 3, see Figs. 1 and 2, while 22 designate bumpers or stops of rubber or other suitable material carried by the arms 19 and engageable with the bed member 6 when the plate 14 is in its horizontal position, as indicated in Fig. 3, and acting to maintain the plate 14 in a horizontal plane above the bed member 6 for positioning a file thereon. It will be understood that brackets 16 are so constructed and related to the plate 14 that when the latter is in upright position, sufficient space is afforded between the plate 14 and the transparent cover to receive the card or record file between and hold it in position for making a photographic copy of the data on the various cards of the file.

In order to maintain the selected file on the support or plate 14 and against the transparent cover, the plate 14, see Figs. 5, 6 and 7, is provided with two pairs of stops, one pair located above the other, to receive and hold a large or small record file, as the case may be. A small file such as indicated in dotted lines at 23, see Fig. 5, rests upon stops or projections 24, see Fig. 7, which are preferably tapered in cross-section as shown and mounted upon the ends of spring plates 25 which are fixedly attached at their opposite ends to the inner surface of the plate 14. The stops 24 are normally in the position illustrated in Fig. 7, ready to receive and hold a file thereon, and are movable through openings provided in the plate 14 against the tension of the spring plates 25 when pressure is applied against the outer ends of the stops 24. Thus when a small file such as indicated at 23 is to be copied, it is supported on the stops 24, as shown in Fig. 7, and rests on said stops when the plate 14 is in its upright position, the file being thus maintained between the plate 14 and the transparent cover 4. The plate 14 and card file carried thereby are held in such vertical position by the spring catches 21 and when the exposure is completed, the catches 21 are released and the plate 14 with the card file thereon is swung by the operator down to horizontal position to permit removal of the file from the plate 14, after which another file can be arranged thereon or plate 14 removed if thin sheets are to be copied.

In order to accommodate a large card file such as illustrated at 26 in Figs. 5 and 6, the plate 14 is provided at its lower edge with clips 27 attached thereto and having laterally extending flanges 28 at their upper edges, see Fig. 6, that receive and support a large card file such as indicated at 26. When a large file is selected and positioned against the plate 14 on stops 28, the file presses inwardly the previously described stops 24 mounted upon the spring plates 25, the stops 24 being movable during such operation through the openings in the supporting plate to inoperative position to permit accommodating a large card file.

In operation, when it is desired to copy a file of the type referred to, the brackets 16 of the support or plate 14 are mounted on the trunnions 18 of frame 3 and arranged in the horizontal position illustrated in Fig. 3, whereupon the selected file, either small or large, is positioned on the support of plate 14, resting against the stops 24 or against flanges 28 respectively and properly centered endwise of the transparent cover, after which the plate 14 is elevated to its upright position and the spring catches 21 engaged with the lugs 8 on the frame 3. The file is then maintained against the transparent cover 4 in proper position for photographing.

While the invention has been described with reference to the particular structure shown herein, it is not confined to the details disclosed, and this application is intended to cover such departures or modifications as may come within the purposes of the improvement or the scope of the following claims.

We claim:
1. In a photographic copying apparatus, the combination with a vertically arranged transparent cover, a frame for said transparent cover, trunnions attached to the sides of said frame at points spaced above the bottom thereof, a card-file supporting plate, brackets fixed at the sides of said supporting plate and having portions extending beyond the end of the plate and detachably engaging said trunnions and swingable thereon whereby to hold said plate spaced from and parallel to said transparent cover, said supporting plate being spaced from the transparent cover when in upright position, and two pairs of stop devices at different levels on the supporting plate acting to maintain a large or small card file in position thereon between the plate and transparent cover, the stop devices at the upper level being mounted on spring plates and movable through the plate to inoperative positions when a large file is positioned on the plate.

2. In a photographic copying apparatus, the combination with a transparent cover and frame therefor, of trunnions mounted on the sides of said frame at points spaced above the bottom thereof, a supporting plate, brackets carried at the sides of said supporting plate having slots therein removably engageable with said trunnions, said slots being inclined upwardly from the bottom edge of said brackets toward the outer edge of the supporting plate, the supporting plate being arranged in spaced relation to the transparent cover when in upright position, means carried by the supporting plate engageable with a surface therebeneath and acting to hold the supporting plate in horizontal position, locking devices mounted on the supporting plate and releasably engageable with said frame when the supporting plate is in upright position, and stop devices carried by the supporting plate arranged at different levels thereon acting to hold card files of different sizes positioned between the supporting plate and transparent cover, the upper stop devices being mounted on spring plates and movable through openings in the supporting plate to inoperative positions when a card file is positioned on the lower stop devices.

3. In a photographic copying apparatus, the combination with a supporting bracket having a transparent cover frame and bed member coaxially pivoted thereon and means connected to the cover frame and acting to maintain it in vertical position, of trunnions attached to the sides of said cover frame at points spaced above its pivotal axis, a file card supporting plate, brackets fixedly mounted at the sides of said supporting plate having portions extending beyond the end of and above the plate and having slots therein removably engaging said trunnions, said brackets having pivotal movement on the trunnions and permitting the card file supporting plate to be positioned in substantially spaced parallel relation to the transparent cover with a card file between the cover and plate, said slots being inclined upwardly from the bottom edge of said brackets toward the forward edge of the supporting plate when the latter is in horizontal position, depending arms carried by the supporting plate engaging said bed member and acting to hold the supporting plate in horizontal position above the bed member, said arms extending beyond the forward end of the supporting plate, lugs at the upper edge of said cover frame, spring catches at the outer ends of said arms engaging said lugs, and stop devices carried by the supporting plate extending away from its supporting surface toward the transparent cover and acting to hold a card file vertically positioned between the supporting plate and transparent cover.

References Cited in the file of this patent

UNITED STATES PATENTS

| | | |
|---|---|---|
| 708,369 | Lewis | Sept. 2, 1902 |
| 1,141,704 | French | June 1, 1915 |
| 1,557,468 | Montigny | Oct. 13, 1925 |
| 1,811,123 | Glasser | June 23, 1931 |
| 1,835,340 | Satterlee | Dec. 8, 1931 |
| 1,946,810 | Rowell | Feb. 13, 1934 |
| 2,356,960 | Wekeman | Aug. 29, 1944 |